United States Patent
Francisco

(10) Patent No.: US 9,085,995 B2
(45) Date of Patent: Jul. 21, 2015

(54) ANTI-VORTEX SHEDDING GENERATOR FOR APU SUPPORT

(75) Inventor: Jay M. Francisco, Chula Vista, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 628 days.

(21) Appl. No.: 13/450,036

(22) Filed: Apr. 18, 2012

(65) Prior Publication Data

US 2013/0280027 A1 Oct. 24, 2013

(51) Int. Cl.
| | |
|---|---|
| F01D 25/28 | (2006.01) |
| F01D 25/16 | (2006.01) |
| F01D 25/30 | (2006.01) |
| F02C 7/32 | (2006.01) |
| B64D 41/00 | (2006.01) |
| F02K 1/04 | (2006.01) |

(52) U.S. Cl.
CPC ............. *F01D 25/162* (2013.01); *F01D 25/30* (2013.01); *F02C 7/32* (2013.01); *B64D 41/00* (2013.01); *F02K 1/04* (2013.01); *F05D 2220/50* (2013.01); *F05D 2240/126* (2013.01); *Y02T 50/671* (2013.01)

(58) Field of Classification Search
CPC .......................... F01D 25/30; F05D 2240/126
USPC ....................................................... 415/211.2
See application file for complete search history.

(56) References Cited

U.S. PATENT DOCUMENTS

| | | | | |
|---|---|---|---|---|
| 2,604,838 | A | * | 7/1952 | Traver ................ 454/1 |
| 3,076,533 | A | | 2/1963 | Scruton et al. |
| 3,991,550 | A | * | 11/1976 | Cohen .............. 57/212 |
| 4,059,129 | A | * | 11/1977 | Feis ................. 138/37 |
| 4,991,976 | A | | 2/1991 | Byles |
| 5,746,574 | A | * | 5/1998 | Czachor et al. ........... 415/115 |
| 6,347,911 | B1 | * | 2/2002 | Blair et al. ............. 405/216 |
| 6,896,447 | B1 | * | 5/2005 | Taquino ............... 405/216 |
| 7,419,121 | B2 | | 9/2008 | Williams |
| 7,526,921 | B2 | | 5/2009 | Williams et al. |
| 7,540,141 | B2 | | 6/2009 | Goldberg et al. |
| 7,578,369 | B2 | | 8/2009 | Francisco et al. |
| 7,836,780 | B2 | | 11/2010 | Garnett et al. |
| 7,857,594 | B2 | | 12/2010 | Kidikian et al. |
| 8,066,096 | B1 | | 11/2011 | Francisco et al. |
| 8,096,498 | B2 | | 1/2012 | Francisco |
| 2002/0084381 | A1 | | 7/2002 | Lemire et al. |
| 2002/0146287 | A1 | | 10/2002 | Allen et al. |

(Continued)

FOREIGN PATENT DOCUMENTS

CA 1 132 410 A1 9/1982

OTHER PUBLICATIONS

R. A. Kumar et al., "Passive Control of Vortex-Induced Vibrations: An Overview", from Recent Patents on Mechanical Engineering 2008, vol. 1, pp. 1-11.

(Continued)

*Primary Examiner* — Ninh H Nguyen

(74) *Attorney, Agent, or Firm* — Kinney & Lange, P.A.

(57) ABSTRACT

An assembly for use with a power-producing unit includes an annular case, a hub positioned radially inward of the case, a fluidic flow path defined between the case and the hub, a plurality of support tubes each extending between the case and the hub, and a flow modifying structure positioned on an exterior surface of at least a first one of the support tubes and configured to reduce vortex shedding of a passing fluid.

12 Claims, 5 Drawing Sheets

(56) References Cited

U.S. PATENT DOCUMENTS

| | | |
|---|---|---|
| 2002/0168232 A1 | 11/2002 | Xu et al. |
| 2005/0254903 A1 | 11/2005 | McMillan et al. |
| 2006/0177275 A1 | 8/2006 | Allen et al. |
| 2006/0231008 A1 | 10/2006 | Allen et al. |
| 2006/0280559 A1 | 12/2006 | Allen et al. |
| 2007/0056292 A1 | 3/2007 | Michalski, Jr. et al. |
| 2007/0057128 A1 | 3/2007 | Michalski, Jr. et al. |
| 2007/0125546 A1 | 6/2007 | Allen et al. |
| 2008/0031306 A1 | 2/2008 | Yamada et al. |
| 2008/0236939 A1 | 10/2008 | Napier et al. |
| 2009/0220307 A1 | 9/2009 | Allen et al. |
| 2009/0242207 A1 | 10/2009 | Allen et al. |
| 2009/0269143 A1 | 10/2009 | Allen et al. |
| 2009/0274521 A1 | 11/2009 | Allen et al. |
| 2010/0038471 A1 | 2/2010 | Olsen et al. |
| 2010/0054927 A1* | 3/2010 | Almstedt et al. .............. 415/180 |
| 2010/0061809 A1 | 3/2010 | Allen et al. |
| 2011/0084192 A1 | 4/2011 | Olsen et al. |
| 2011/0200396 A1 | 8/2011 | Allen et al. |
| 2012/0006053 A1 | 1/2012 | Allen et al. |

OTHER PUBLICATIONS

"Vortex Shedding", Wikipedia, at <http://en.wikipedia.org/wiki/Vortex_Shedding> Jun. 2, 2011, 3 pages.

* cited by examiner

ANTI-VORTEX SHEDDING GENERATOR FOR APU SUPPORT

BACKGROUND

The present invention relates to noise attenuation systems. In particular, the present invention relates to noise attenuation systems suitable for use with gas turbine engines such as aircraft auxiliary power unit (APU) turbine engines to reduce vortex shedding.

Large commercial aircraft typically include on-board APU turbine engines, located in the tail sections of the aircraft, to provide electrical power and compressed air for systems throughout the aircraft. When an aircraft is on the ground, the primary propulsion engines of the aircraft are often shut down, and the APU turbine engine provides the main source of power for a variety of systems, such as the environmental control systems, hydraulic pumps, electrical systems, and main engine starters. The APU turbine engine may also provide power during in-flight operations, such as for electrical and pneumatic systems.

In many gas turbine engine applications, particularly those in which the engine is used in conjunction with a commercial passenger aircraft, there is a widespread demand by the airline industry to maintain noise levels below defined limits. This is particularly important at ground service stations for the aircraft, where ground crew load and unload luggage, fuel and provision the aircraft, and remove waste materials from the aircraft. Under these conditions, the aircraft APU is the turbine engine of interest.

A typical prior art APU includes a turbine shaft supported at an aft end by bearings, which are in turn supported by aerodynamically-shaped struts that provide fixed mounting to a case and/or other mounting structure relative to the airframe. These prior art APUs typically include lubricant conduits situated within the aerodynamically-shaped struts to provide lubricant supply and return paths to a bearing assembly located at a central hub that is supported by the struts. However, noise can be developed by the aerodynamic struts as exhaust flows pass by. It is desired to reduce noise generated by APU exhaust flows.

SUMMARY

An assembly for use with a power-producing unit according to the present invention includes an annular case, a hub positioned radially inward of the case, a fluidic flow path defined between the case and the hub, a plurality of support tubes each extending between the case and the hub, and a flow modifying structure positioned on an exterior surface of at least a first one of the support tubes and configured to reduce vortex shedding of a passing fluid.

Figure 1:
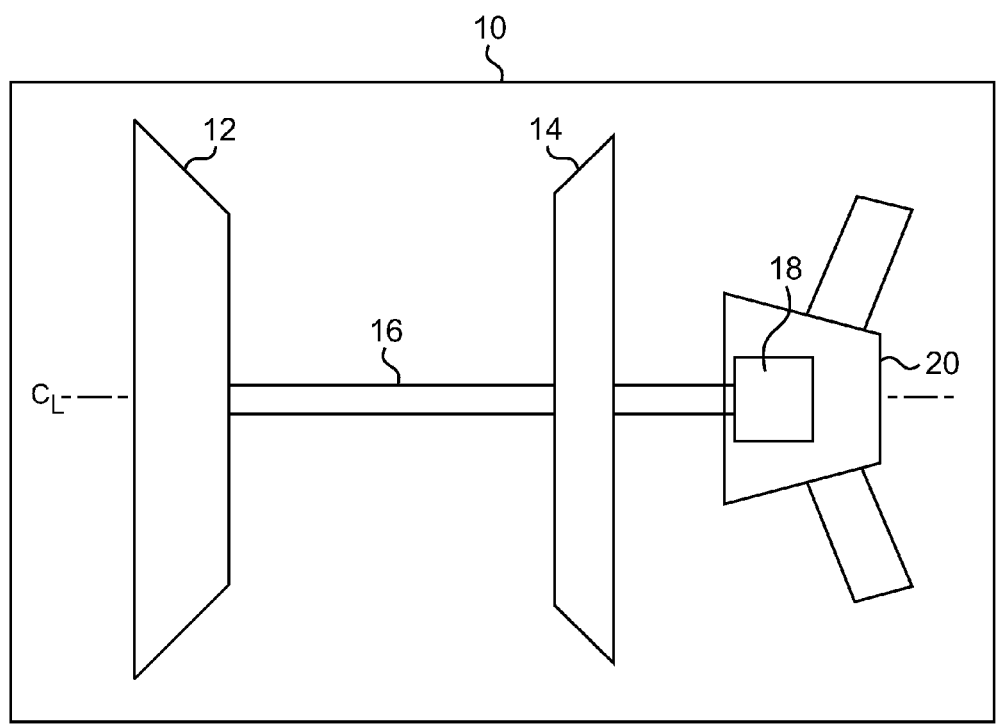
FIG. 1 is a schematic illustration of an auxiliary power unit (APU).

While the above-identified drawing figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

In general, the present invention relates to a passive anti-vortex shedding apparatus suitable for use with an exhaust case support for an auxiliary power unit (APU) for an aircraft or other power-producing unit. The apparatus of the present invention can help reduce pressure pulses, swirl angle and shear effects and help straighten exhaust flows, which in turn helps reduce noise caused by exhaust flows. In one embodiment the anti-vortex shedding apparatus can comprise a plurality of discrete, spaced-apart elliptical elements, which can be positioned parallel to each other or can have different orientation angles selected as a function of fluid flow parameters (e.g., swirl angle distribution, velocity distribution, etc.). In another embodiment, the anti-vortex shedding apparatus can comprise at least one strake helically wrapped about a substrate. The anti-vortex shedding apparatus facilitates the use of tubular support members for an APU exhaust case, which can provide a weight reduction over prior art aerodynamic struts with separate, internal lubricant conduits. Such tubular supports can be generally circular or elliptical in cross-section, for example. Other features and benefits of the present invention will be appreciated by those of ordinary skill in the art in view of the description that follows and the accompanying figures.

FIG. 1 is a schematic illustration of an auxiliary power unit (APU) 10, which includes a compressor section 12, a turbine section 14, a shaft 16, a bearing set 18, and an exhaust case assembly 20. The APU 10 defines a centerline axis $C_L$. The APU 10 is generally configured to operate as a gas turbine engine, which is well-known in the art and therefore further explanation of their operation here is unnecessary. It should be noted that the illustration of the APU 10 is highly schematic, and is shown merely by way of example and not limitation. Numerous APU configurations are possible. APUs may include additional components not specifically shown in FIG. 1 for simplicity. The APU 10 can be used with an aircraft (not shown), and supported by an airframe (not shown).

The bearing set 18 provides rotatable support to the shaft 16 at generally an aft end of the APU 10, in order to support the shaft 16 and any attached components relative to the rest of the APU 10 and the airframe. The bearing set 18 typically requires lubrication. Lubricant supply and return paths can be provided through the exhaust case assembly 20, as explained further below.

Exhaust flows passing aft from the turbine section 14 pass by the exhaust case assembly 20. Exhaust flows leaving the turbine section 14 are typically not straight but have swirl. A swirl angle of the exhaust flow may be irregular, that is, the swirl angle may vary over radial and/or circumferential locations. Moreover, the velocity distribution of the exhaust flow may vary over radial and/or circumferential locations. Swirl and velocity distributions can cause undesirable shear effects when passing the exhaust case assembly, which can produce undesired noise.

Exhaust flows leaving the exhaust case assembly 20 can pass to a silencer assembly (not shown). For instance, one silencer assembly is disclosed in commonly-assigned U.S. Pat. App. Pub. No. 2009/0078496. However, swirling fluid flows entering a silencer are undesirable.

Figure 2:
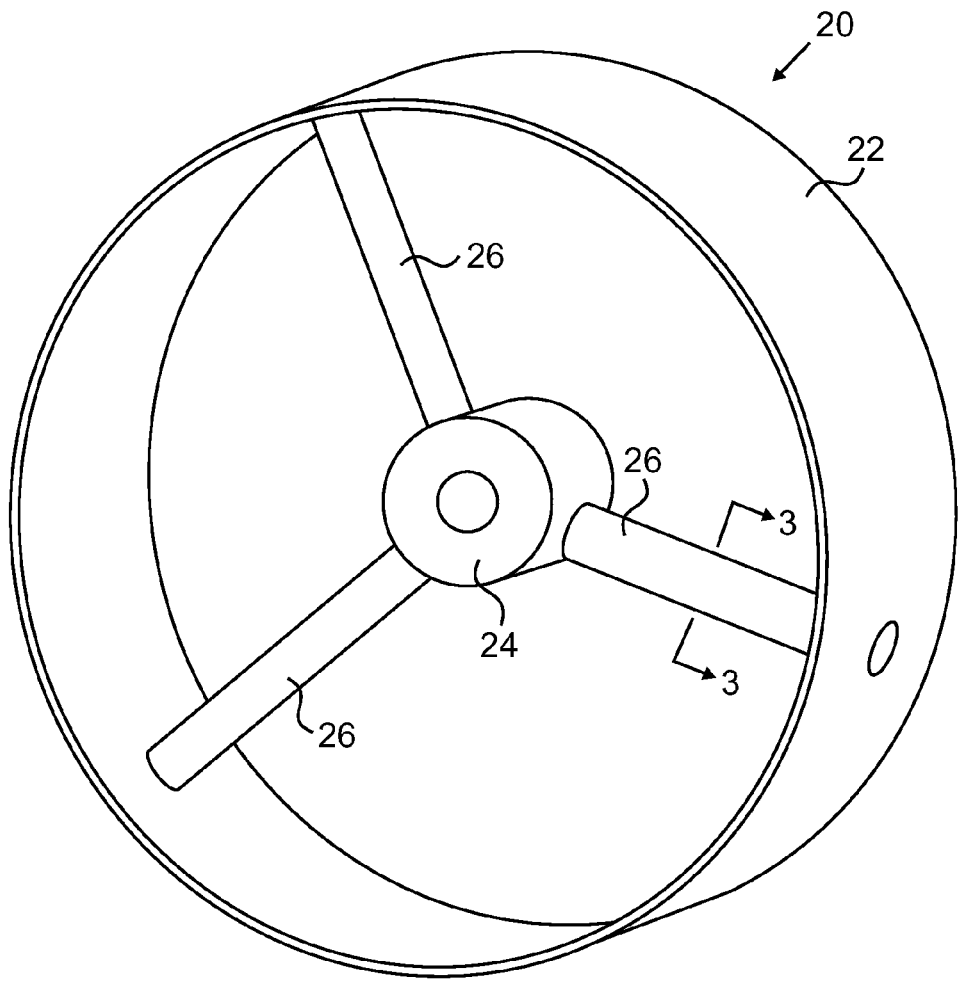
FIG. 2 is a perspective view of an exhaust case assembly for the APU of FIG. 1.

FIG. 2 is a perspective view of an embodiment of the exhaust case assembly 20 that includes a case 22, a hub 24, and supports 26. In the illustrated embodiment, case 22 is configured in a generally annular or cylindrical shape, and the hub 24 is provided in a central location (i.e., along a centerline axis of the APU 10) radially inward of the case 22 to house and support the bearing set 18 (not visible in FIG. 2). A fluid flow path is defined between the case 22 and the hub 24. The supports 26 extend generally radially between the case 22 and the hub 24, and can be rigidly fixed therebetween. Although three supports 26 are provided, any number of supports can be provided in further embodiments, as desired for particular applications. The supports 26 can each have a tubular shape as opposed to an aerodynamic airfoil shape as in the prior art. Prior art aerodynamic/airfoil shaped struts have a relatively large surface area that can change or disrupt the flow characteristics of the exhaust flow, and the uneven or irregular distribution of the flow characteristics can interact with such airfoil-shaped struts to generate undesirable noise.

Figure 3A:
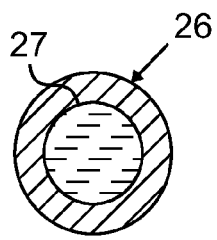
FIG. 3A is a cross-sectional view of one embodiment of a support tube, taken along line 3-3 of FIG. 2.
Figure 3B:
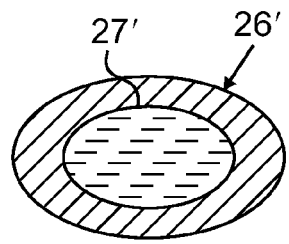
FIG. 3B is a cross-sectional view of another embodiment of a support tube, taken along line 3-3 of FIG. 2.

FIG. 3A is a cross-sectional view of one embodiment of a hollow support tube 26, taken along line 3-3 of FIG. 2. As shown in FIG. 3A, the support tube 26 has a generally circular (i.e., cylindrical) cross-sectional shape, and includes an interior passage 27 for fluid (e.g., liquid lubricant) to flow in a generally radial path that traverses the exhaust fluid flow path defined between the case 22 and the hub 24. The illustrated embodiment of the tube 26 can provide structural support and fluid routing through the interior passage 27 in an integral and monolithic structure, which can reduce weight of the exhaust case assembly 20 over prior art designs that utilized a separate lubrication tube inside a separate aerodynamic strut. FIG. 3B is a cross-sectional view of an alternative embodiment of a hollow support tube 26', taken along line 3-3 of FIG. 2. As shown in FIG. 3B, the support tube 26' has a generally elliptical cross-sectional shape, and includes an interior passage 27' for fluid (e.g., lubricant) to flow. The support 26' can provide structural support and fluid routing through the interior passage 27' in an integral and monolithic structure, with corresponding weight savings over the prior art. It should be noted that the embodiments of the support 26 shown in FIGS. 3A and 3B are shown merely by way of example and not limitation, and numerous other tubular shapes are possible.

Tubular exhaust case supports were not used in the prior art because tubular elements in fluid flows produce vortex shedding effects that produce turbulence downstream and lead to undesirable noise. However, the present invention provides for passive anti-vortex shedding structures (i.e., generators) to reduce or eliminate vortex shedding effects produced by tubular structures in a fluid flow. Tubular exhaust case supports can also reduce weight compared to prior art aerodynamic struts have a separate internal lubrication conduit structure. Weight savings can be a critical factor in aircraft design and application.

Figure 4A:
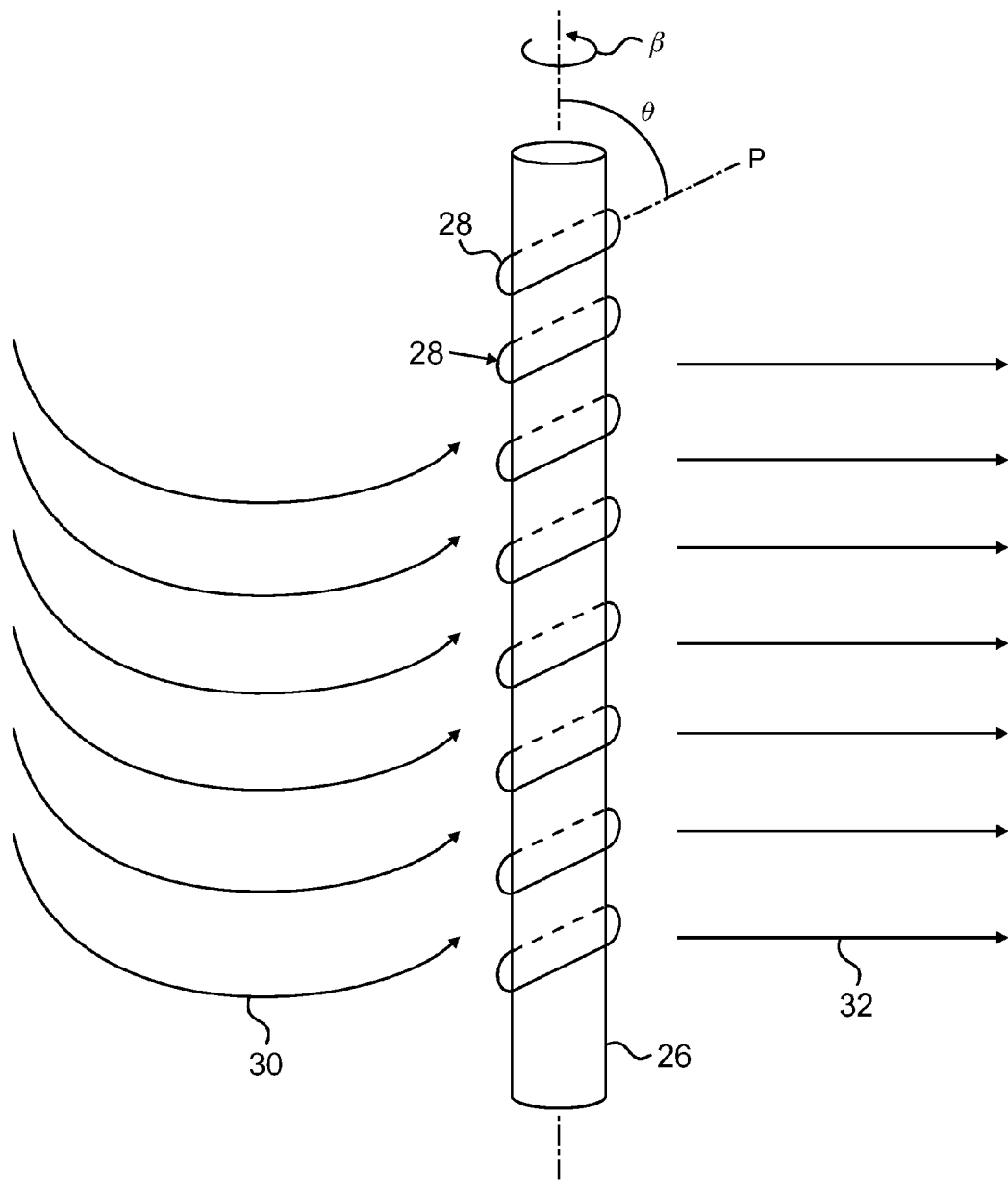
FIG. 4A is an elevation view of a support tube of the exhaust case assembly with one embodiment of an anti-vortex shedding structure.

FIG. 4A is an elevation view of one support tube 26 of the exhaust case assembly 20 with one embodiment of an anti-vortex shedding or flow-modifying structure 28 positioned on an exterior surface of the tube 26. The structure 28 can be positioned on one or more of the tubes 26 of the exhaust case assembly 20. As shown in FIG. 4A, an upstream exhaust flow 30 approaches the support tube 26 with swirl. A swirl angle $\alpha$ of the flow 30 may be substantially constant over radial and circumferential locations, or can vary with a distribution of swirl angles $\alpha$ in radial and/or circumferential directions. Furthermore, a velocity V of the flow 30 may be substantially constant over radial and circumferential locations, or can vary with a distribution of velocities V in radial and/or circumferential directions. A downstream fluid flow 32 is produced by fluid that has passed the support 26 and the anti-vortex shedding structure 28. The structure 28 can help produce a downstream flow 32 that is substantially straight, that is, can help reduce or eliminate swirl and other undesired flow characteristics.

In the illustrated embodiment of FIG. 4A, the anti-vortex shedding or flow-modifying structure 28 comprises a plurality of discrete (i.e., non-helical), axially-spaced elements (individual elements can be designated by reference characters in the format $28_x$ such as $28_1$ and $28_2$ or simply by the generic reference character 28) that wrap around the support tube 26 in a generally elliptical shape. A surface shape of the individual elements 28 can vary as desired for particular applications. In the illustrated embodiment the elements have a rounded surface shape without sharp corners. The support tube 26 defines an axis A, and the individual elements 28 are spaced apart along the axis A. Each of the elements 28 can be arranged in a plane P that is arranged at an angle $\theta$ relative to the axis A, wherein the angle $\theta$ is greater than 0° and less than 90°. The individual elements 28 also have an azimuthal or yaw angle $\beta$ about the axis A relative to the centerline axis $C_L$ (shown in FIG. 1), which can be substantially equal. Particular configurations of the elements 28 can be developed with the assistance of computational fluid dynamics analysis. In one embodiment, all of the elements 28 are arranged parallel to one another, that is, with planes P all arranged at the same angles $\theta$ and $\beta$.

Figure 4B:
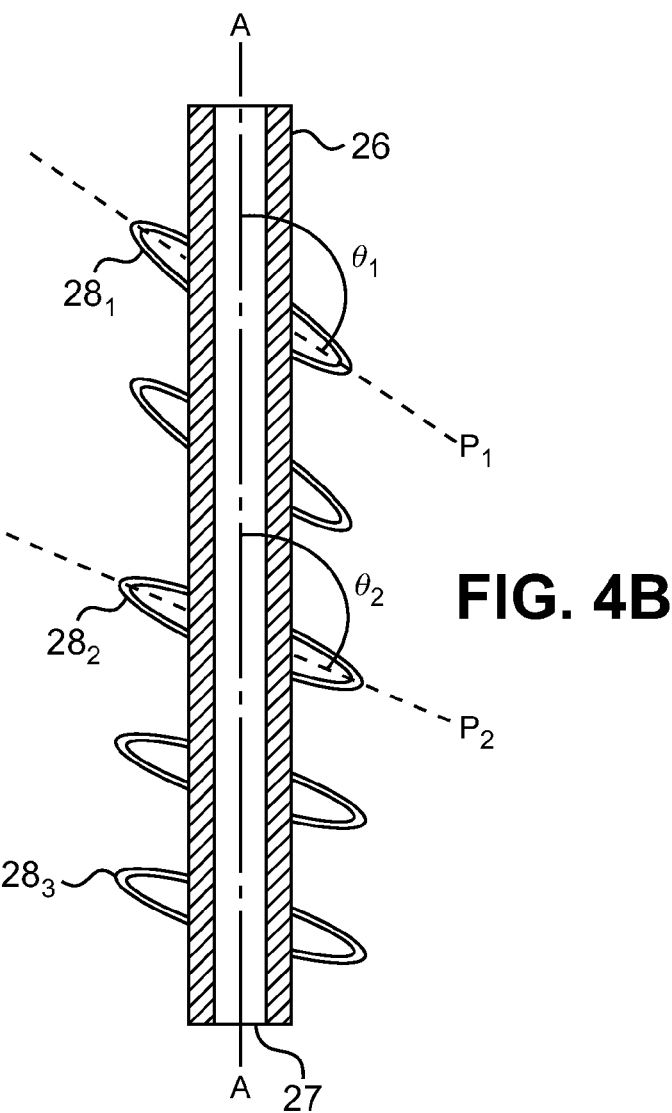
FIG. 4B is cross-sectional view of a support tube of the exhaust case assembly with another embodiment of an anti-vortex shedding structure.
Figure 4C:
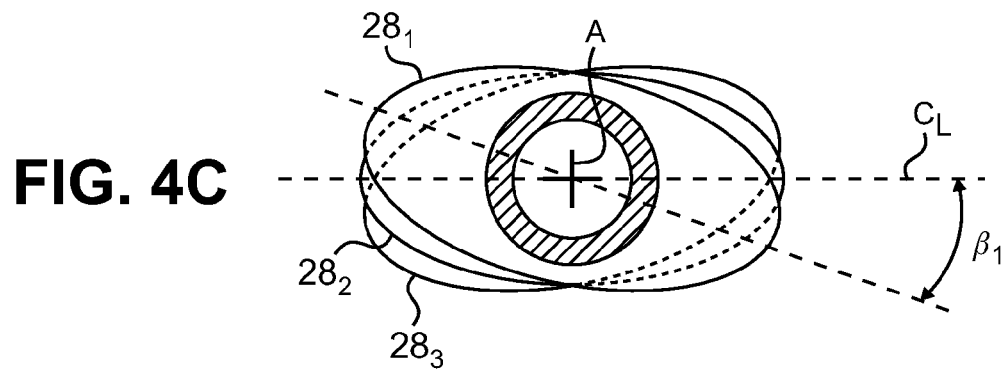
FIG. 4C is a top view of the support tube of FIG. 4B, shown in isolation.

In alternative embodiments, the arrangement or configuration of the elements 28 can vary along the axis A. FIG. 4B is an elevation view of the support tube 26 of the exhaust case assembly 20, and FIG. 4C is a top view of the embodiment of the support tube 26 of FIG. 4B. As shown in FIG. 4B, one or more elements $28_1$ can be arranged at an angle $\theta_1$ and one or more elements $28_2$ can be arranged at an angle $\theta_2$ that is different from the angle $\theta_1$. Variations in azimuthal or yaw angle $\beta$ are possible too, as shown in FIG. 4C.

The individual elements 28 on a given support 26 can be arranged in any number of groups having different (i.e., non-parallel) orientations. In general, the orientation of the individual elements 28 can be selected as a function of expected fluid flow characteristics of the flow 30, including the swirl angle distribution and/or the velocity distribution, in order to provide fluid flow modification tailored to particular characteristics of portions of the upstream flow 30 in order to help produce a relatively straight downstream flow 32.

Figure 5:
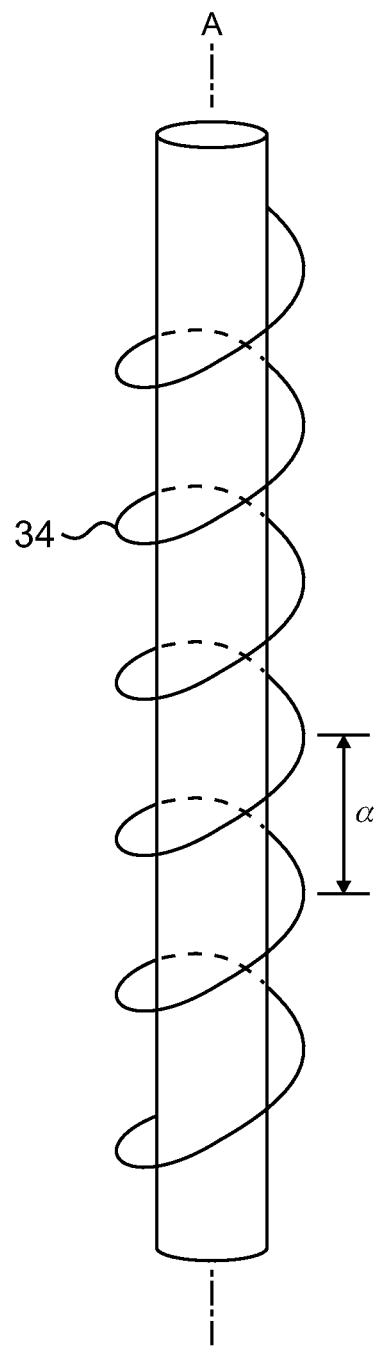
FIG. 5 is an elevation view of a support tube of the exhaust case assembly with yet another embodiment of an anti-vortex shedding structure.

FIG. 5 is an elevation view of a support tube of the exhaust case assembly 20 with yet another embodiment of an anti-vortex shedding or flow-modifying structure 34. In the embodiment illustrated in FIG. 5, the structure 34 comprises at least one strake, that is, a helically-wound element that wraps around the support tube 26. In some embodiments, the structure 34 can have a uniform, symmetrical helix shape, or in alternative embodiments can have an irregular shape that varies along the axis A (e.g., with a variable pitch α) as a function of the fluid flow characteristics of the upstream flow 30 (not shown in FIG. 4B), including the swirl angle distribution and/or the velocity distribution, in order to provide fluid flow modification tailored to particular characteristics of portions of the upstream flow 30 in order to help produce a relatively straight downstream flow 32 (not shown in FIG. 4B).

The configuration of structure 28 or 34 on different supports 26 of the exhaust case assembly 20 can have the same configuration or a different configuration. For instance, different configurations can be used to accommodate differential fluid flow modification at different circumferential locations.

It should be understood that the present invention provides numerous advantages and benefits. For example, a tubular support for an APU exhaust case provides a reduction in surface area compared to prior art aerodynamic struts, which can help reduce noise. Furthermore, a passive anti-vortex shedding structure on a tubular strut according to the present invention can reduce undesired swirl and velocity characteristics to provide a more desirable fluid flow downstream from the tubular support.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

An assembly for use with a power-producing unit, the assembly including an annular case; a hub positioned radially inward of the case, wherein a fluidic flow path is defined between the case and the hub; a plurality of support tubes each extending between the case and the hub; and a flow modifying structure positioned on an exterior surface of at least a first one of the support tubes and configured to reduce vortex shedding of a passing fluid.

The assembly of the preceding paragraph can optionally include, additionally and/or alternatively, any one or more of the following features, configurations and/or additional components:

the flow modifying structure can comprise a plurality of discrete elements spaced apart along an axis of the first one of the support tubes;

the discrete elements can each be arranged in a corresponding plane, each plane positioned at an angle θ that is greater than 0° and less than 90° with respect to the axis of the first one of the support tubes;

the discrete elements can each be arranged in a corresponding plane, wherein the plane of a first of the discrete elements is positioned at an angle θ1 that is greater than 0° and less than 90° with respect to the axis of the first one of the support tubes, wherein the plane of a second of the discrete elements is positioned at an angle θ2 that is greater than 0° and less than 90° with respect to the axis of the first one of the support tubes, and wherein the angles θ1 and θ2 are different;

the discrete elements can each comprise a substantially elliptical shape;

the discrete elements can each be arranged at an angle β with respect to a centerline axis of the power-producing unit, and wherein an angle β1 of a first of the discrete elements is different from an angle β2 of a second of the discrete elements;

the flow modifying structure can comprise a strake;

the strake can have a substantially constant pitch along an axis of the first one of the support tubes;

the strake can have a pitch that varies along an axis of the first one of the support tubes;

a configuration of the flow modifying structure can vary along an axis of the first one of the support tubes;

the configuration of the flow modifying structure along the axis of the first one of the support tubes can be matched to expected flow characteristics of passing fluid;

the expected flow characteristics of passing fluid can include at least one of swirl angle distribution and velocity distribution;

each of the plurality of support tubes can be rigidly fixed to both the hub and the case;

an interior passageway can be integrally formed with support tube to permit a liquid lubricant to flow to or from the hub across the fluidic flow path; and/or a turbine section configured to produce a swirling exhaust flow, wherein the plurality of support tubes are positioned downstream of the turbine section.

A method for use with operating a power unit includes generating a fluid flow having swirl; passing the fluid flow around a tubular support; and modifying the fluid flow passing the tubular support with a flow modifying structure to reduce vortex shedding effects.

The method of the preceding paragraph can optionally include, additionally and/or alternatively, any one or more of the following features and/or additional steps:

identifying at least one fluid flow distribution characteristic of the fluid flow at the tubular support; and selecting a variation in a configuration of the flow modifying structure as a function of the least one fluid flow distribution characteristic; and/or the variation in a configuration of the flow modifying structure can comprise varying at least one of an angle θ of discrete elements relative to an axis of the tubular support and an angle β relative to a centerline axis of the power unit;

An exhaust case assembly for use with an auxiliary power unit having a turbine section includes an annular case; a hub positioned radially inward of the case, wherein a fluidic flow path is defined between the case and the hub; a plurality of support tubes each extending between the case and the hub; and a flow modifying structure positioned on an exterior surface of at least a first one of the support tubes and configured to reduce vortex shedding of a passing fluid, wherein a configuration of the flow modifying structure varies along an axis of the first one of the support tubes.

The assembly of the preceding paragraph can optionally include, additionally and/or alternatively, any one or more of the following features, configurations and/or additional components:

the flow modifying structure can comprise a plurality of discrete elements spaced apart along an axis of the first one of the support tubes, wherein the discrete elements are each arranged in a corresponding plane, wherein the plane of a first of the discrete elements is positioned at an angle θ1 that is greater than 0° and less than 90° with respect to the axis of the first one of the support tubes, wherein the plane of a second of the discrete elements is positioned at an angle θ2 that is greater than 0° and less than 90° with respect to the axis of the first one of the support tubes, and wherein the angles θ1 and θ2 are different; and/or the discrete elements can each be arranged at an angle β with respect to a centerline axis of the power-producing unit, and wherein an angle β1 of a first of the discrete elements is different from an angle β2 of a second of the discrete elements.

The invention claimed is:

1. An assembly for use with a power-producing unit, the assembly comprising:
    an annular case;
    a hub positioned radially inward of the case, wherein a fluidic flow path is defined between the case and the hub;
    a plurality of support tubes each extending between the case and the hub; and
    a flow modifying structure positioned on an exterior surface of at least a first one of the support tubes and configured to reduce vortex shedding of a passing fluid, wherein the flow modifying structure comprises a plurality of discrete elements spaced apart along an axis of the first one of the support tubes, and wherein the discrete elements each comprise a substantially elliptical shape.

2. The assembly of claim 1, wherein the discrete elements are each arranged in a corresponding plane, each plane positioned at an angle θ that is greater than 0° and less than 90° with respect to the axis of the first one of the support tubes.

3. The assembly of claim 1, wherein the discrete elements are each arranged in a corresponding plane, wherein the plane of a first of the discrete elements is positioned at an angle $\theta_1$ that is greater than 0° and less than 90° with respect to the axis of the first one of the support tubes, wherein the plane of a second of the discrete elements is positioned at an angle $\theta_2$ that is greater than 0° and less than 90° with respect to the axis of the first one of the support tubes, and wherein the angles $\theta_1$ and $\theta_2$ are different.

4. The assembly of claim 1, wherein the discrete elements are each arranged at an angle β with respect to a centerline axis, and wherein an angle $\beta_1$ of a first of the discrete elements is different from an angle $\beta_2$ of a second of the discrete elements.

5. The assembly of claim 1, wherein a configuration of the flow modifying structure varies along an axis of the first one of the support tubes.

6. The assembly of claim 5, wherein the configuration of the flow modifying structure along the axis of the first one of the support tubes is matched to expected flow characteristics of passing fluid.

7. The assembly of claim 6, wherein the expected flow characteristics of passing fluid include at least one of swirl angle distribution and velocity distribution.

8. The assembly of claim 1, wherein an interior passageway is integrally formed with support tube to permit a liquid lubricant to flow to or from the hub across the fluidic flow path.

9. The assembly of claim 1 and further comprising:
    a turbine section configured to produce a swirling exhaust flow, wherein the plurality of support tubes are positioned downstream of the turbine section.

10. An exhaust case assembly for use with an auxiliary power unit having a turbine section, the assembly comprising:
    an annular case;
    a hub positioned radially inward of the case, wherein a fluidic flow path is defined between the case and the hub;
    a plurality of support tubes each extending between the case and the hub; and
    a flow modifying structure positioned on an exterior surface of at least a first one of the support tubes and configured to reduce vortex shedding of a passing fluid, wherein a configuration of the flow modifying structure varies along an axis of the first one of the support tubes, wherein the flow modifying structure comprises a plurality of discrete elements having a non-helical configuration each wrapped around the first one of the support tubes and spaced apart along an axis of the first one of the support tubes, and wherein the discrete elements are each arranged with a major axis at a yaw angle β with respect to a centerline axis, and wherein a yaw angle $\beta_1$ of a first of the discrete elements is different from a yaw angle $\beta_2$ of a second of the discrete elements.

11. The assembly of claim 10, wherein the discrete elements are each arranged in a corresponding plane, wherein the plane of a first of the discrete elements is positioned at an angle $\theta_1$ that is greater than 0° and less than 90° with respect to the axis of the first one of the support tubes, wherein the plane of a second of the discrete elements is positioned at an angle $\theta_2$ that is greater than 0° and less than 90° with respect to the axis of the first one of the support tubes, and wherein the angles $\theta_1$ and $\theta_2$ are different.

12. The assembly of claim 10, wherein the discrete elements each comprise a substantially elliptical shape.

* * * * *